(12) United States Patent
Ichihashi

(10) Patent No.: US 8,997,923 B2
(45) Date of Patent: Apr. 7, 2015

(54) SOUND WAVE GUIDE FOR USE IN ACOUSTIC STRUCTURES

(71) Applicant: Hexcel Corporation, Dublin, CA (US)

(72) Inventor: Fumitaka Ichihashi, Chandler, AZ (US)

(73) Assignee: Hexcel Corporation, Dublin, CA (US)

( * ) Notice: Subject to any disclaimer, the term of this patent is extended or adjusted under 35 U.S.C. 154(b) by 0 days.

(21) Appl. No.: 13/964,629

(22) Filed: Aug. 12, 2013

(65) Prior Publication Data

US 2015/0041247 A1    Feb. 12, 2015

(51) Int. Cl.
  *E04B 1/82* (2006.01)
  *B32B 3/10* (2006.01)
  *F02C 7/045* (2006.01)

(52) U.S. Cl.
  CPC .. *B32B 3/10* (2013.01); *F02C 7/045* (2013.01)

(58) Field of Classification Search
  CPC .................................................... G10K 11/172
  USPC ........................................ 181/292, 290, 284
  See application file for complete search history.

(56) References Cited

U.S. PATENT DOCUMENTS

| | | | | |
|---|---|---|---|---|
| 3,831,710 A | * | 8/1974 | Wirt | 181/286 |
| 3,834,487 A | * | 9/1974 | Hale | 181/292 |
| 3,887,031 A | * | 6/1975 | Wirt | 181/286 |
| 4,035,535 A | * | 7/1977 | Taylor | 428/116 |
| 4,241,806 A | * | 12/1980 | Metzger | 181/284 |
| 5,445,861 A | | 8/1995 | Newton et al. | |
| 5,760,349 A | * | 6/1998 | Borchers et al. | 181/286 |
| 6,977,109 B1 | * | 12/2005 | Wood | 428/131 |
| 7,434,659 B2 | | 10/2008 | Ayle | |
| 7,510,052 B2 | * | 3/2009 | Ayle | 181/292 |
| 7,819,224 B2 | * | 10/2010 | Borchers et al. | 181/292 |
| 7,837,007 B2 | * | 11/2010 | Hotzeldt et al. | 181/210 |
| 7,854,298 B2 | | 12/2010 | Ayle | |
| 8,689,936 B2 | * | 4/2014 | Richter | 181/292 |

FOREIGN PATENT DOCUMENTS

EP     0976883 A1     2/2000
EP     2605238 A2     6/2013

* cited by examiner

*Primary Examiner* — Forrest M Phillips
(74) *Attorney, Agent, or Firm* — W. Mark Bielawski; David J. Oldenkamp

(57) ABSTRACT

The bandwidth or acoustical range of an acoustic structure is increased by locating a sound wave guide within the acoustic cell. The wave guide divides the cell into two acoustical chambers. The two chambers provide an effective increase in resonator length of the cell.

20 Claims, 3 Drawing Sheets

SOUND WAVE GUIDE FOR USE IN ACOUSTIC STRUCTURES

BACKGROUND OF THE INVENTION

1. Field of the Invention

The present invention relates generally to acoustic structures that are used to attenuate noise that emanates from a particular source. More particularly, the present invention is directed to providing relatively thin acoustic structures that are capable of attenuating a wide range of noise frequencies including relatively low-frequency noise, such as the low-frequency noise that is generated by the engines of aircraft.

2. Description of Related Art

It is widely recognized that the best way of dealing with excess noise generated by a specific source is to treat the noise at the source. This is typically accomplished by adding acoustic damping structures (acoustic treatments) to the structure of the noise source. One particularly problematic noise source is the jet engine used on most passenger aircraft. Acoustic treatments are typically incorporated in the engine inlet, nacelle and exhaust structures. These acoustic treatments include acoustic resonators that contain relatively thin acoustic materials or grids that have millions of holes that create acoustic impedance to the sound energy generated by the engine.

Honeycomb has been a popular material for use in aircraft and aerospace vehicles because it is relatively strong and lightweight. For acoustic applications, such as engine nacelles, acoustic materials are added to the honeycomb structure so that the honeycomb cells are acoustically closed at the end located away from the engine and covered with a porous covering at the end located closest to the engine. The closing of the honeycomb cells with acoustic material in this manner creates an acoustic resonator that provides attenuation, dampening or suppression of the noise. Acoustic septums are also usually located within the interior of the honeycomb cells in order to provide the resonator with additional noise attenuation properties.

A basic problem facing acoustic engineers is to make the nacelle as thin and lightweight as possible while still providing adequate suppression or dampening of the sound wave frequencies over the entire range of noise generated by the jet engine. This basic design problem is complicated by the fact that the trend in newer models of large jet engines is to produce additional noise at lower frequencies. The new engine designs tend to use fewer fan blades that produce more by-pass air at a slower velocities. This results in the production of engine noise having, a lower frequency.

The particular frequencies of noise that are dampened by a given honeycomb cell or resonator is directly related to the depth of the cell. In general, as the frequency of the noise decreases, the depth of the cell must be increased in order to provide adequate damping or suppression. Relatively thin nacelles having cell depths on the order of 1 inch or less are adequate for absorbing the higher frequency ranges generated by a jet engine. However, deeper acoustic cells or resonators are required in order to absorb the lower frequencies that are being generated by newer jet engines.

One approach to solving the problem of absorbing, the lower frequency jet noise is to simply build nacelles with deeper cells. However, this results in an increase in the size and weight of the nacelle which is contrary to the design goal of providing nacelles that are as thin and light weight as possible. In addition, the increase in weight and size of the nacelle required to absorb low-frequency noise may be unacceptable, especially for larger aircraft engines where the size and weight of the nacelle is a major engineering design consideration.

Another approach involves acoustically connecting adjacent cells together in order to increase the effective acoustic depth of the combined cells. This approach does provide lower frequency absorption; however, the number of available acoustic cells is reduced in any given structure due to the combination of multiple cells to form a single acoustic cell. The acoustic interconnection of cells to increase low frequency sound absorption is described in detail in U.S. patent application Ser. No. 13/466,232.

There presently is a need to design engine nacelles and other acoustic structures where the acoustic structure is capable of suppressing a wider range of noise frequencies without increasing the thickness or weight of the nacelle acoustic structure.

SUMMARY OF THE INVENTION

In accordance with the present invention, it was discovered that the bandwidth or acoustical range of a nacelle or other type of acoustic structure can be increased by locating a sound wave guide within the acoustic cell that divides the cell into two acoustical chambers. The two chambers provide an effective increase in resonator length of the cell. As a result, nacelles or other acoustic structures can be made that are capable of absorbing relatively low noise frequencies without increasing the thickness or number of cells in the nacelle.

The present invention is directed to acoustic structures, in general, and to nacelles for aircraft engines, in particular. The acoustic structures in accordance with the present invention include a honeycomb that has a first edge located closest to the noise source and a second edge located away from the noise source. The honeycomb includes a plurality of acoustic cells wherein each of the acoustic cells has a plurality of walls that extend between the first and second edges of the honeycomb. An acoustic barrier is located at the second edge of each acoustic cell to form an acoustic resonator that has a depth that is equal to the distance between the first edge of the honeycomb and the acoustic barrier.

As a feature of the present invention, a sound wave guide is located in the acoustic resonator. The sound wave guide includes an acoustic guide wall having interior and exterior surfaces. The acoustic guide wall has an inlet edge defining a wave guide inlet and an outlet edge defining a wave guide outlet. The wave guide inlet is located closer to the first edge of the honeycomb than the wave guide outlet, so that the acoustic guide wall divides the honeycomb cell into an inner sound wave channel or chamber and an outer sound wave chamber. The inner chamber is bordered by the interior surface of the acoustic guide wall, the wave guide inlet, the wave guide outlet and the portion of the cell wall that extends between the wave guide inlet and the first edge of the cell. The outer sound wave chamber is bordered by the exterior surface of the acoustic guide wall, the acoustic barrier, the wave guide outlet and the cell wall. The inner and outer sound chambers, which are connected at the wave guide outlet, provide an effective acoustic chamber that is much longer than the thickness of the honeycomb.

A wide variety of effective acoustic lengths and other acoustic properties of the honeycomb cells can be achieved by simply varying the length, location, size and shape of the sound wave guide. The present invention provides a significant advantage over conventional acoustic honeycomb where the acoustic cells all have the same effective acoustic lengths and the only way of lengthening the cells is to increase the thickness of the honeycomb. The ability to acoustically lengthen honeycomb cells without increasing the honeycomb thickness is especially useful for jet engine nacelles where it is desirable to make the honeycomb as thin as possible while still providing acoustic resonators that are capable of dampening low-frequency jet engine noise.

The above described and many other features and attendant advantages of the present invention will become better understood by reference to the following detailed description when taken in conjunction with the accompanying drawings.

DETAILED DESCRIPTION OF THE INVENTION

Figure 1:
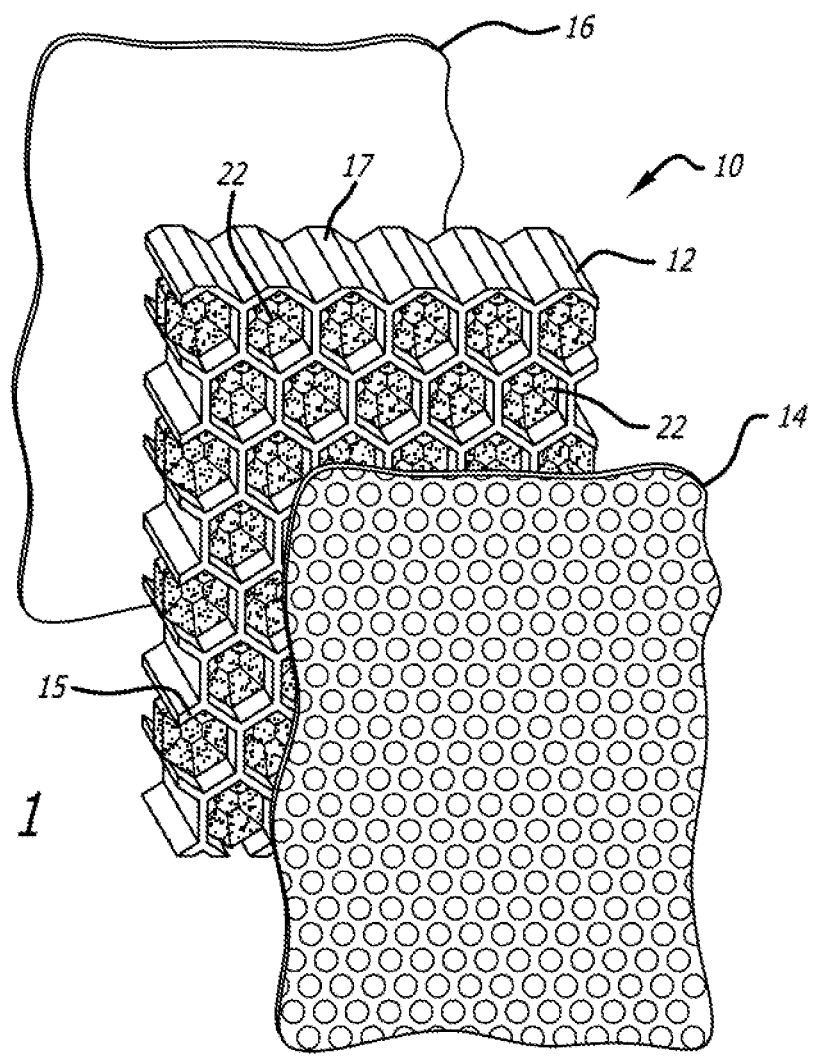
FIG. 1 shows an exemplary acoustic structure in accordance with the present invention prior to the solid and the porous face sheets being bonded to honeycomb.
Figure 5:
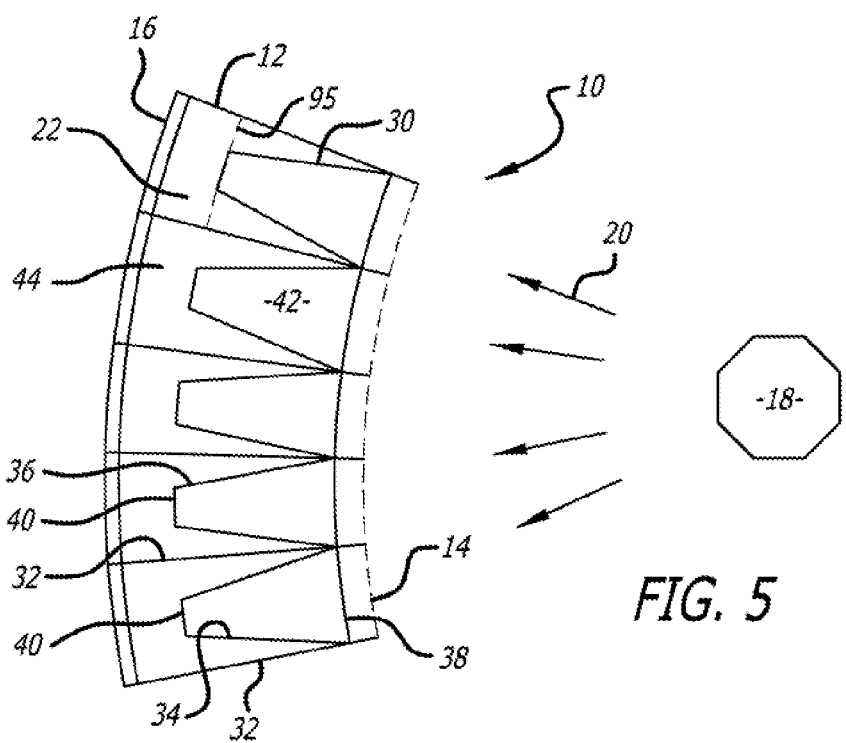
FIG. 5 is a further schematic drawing showing a portion of an acoustic structure in accordance with the invention next to a noise source.

A partially exploded view of a portion of an exemplary acoustic structure in accordance with the present invention is shown at 10 in FIG. 1. The acoustic structure 10 includes an acoustic honeycomb 12 which is sandwiched between a porous face sheet 14 and a solid acoustic barrier face sheet 16. A portion of the assembled acoustic structure 10 is shown in FIG. 5 where it is located adjacent to a noise source 18 which is generating noise as represented by arrows 20.

Although the acoustic structure of the present invention may be used for damping noise from a wide variety of noise sources, the acoustic structure is particularly well-suited for dampening noise generated by aircraft engines and particularly the large engines used for commercial aircraft. Accordingly, the acoustic structure shown at 10 in FIG. 5 is typically part of a nacelle which surrounds the central core of a turbofan jet engine 18.

The honeycomb 12 includes a first edge 15 that is located closest to the noise source 18 and a second edge 17 that is located away from the noise source 18. The walls of the honeycomb extend between the first and second edges to form a plurality of cells 22 that each has a cross-sectional area measured perpendicular to the walls. An acoustic barrier is located at or near the second edge 17 of each cell in order to make each cell an acoustic resonator. Although acoustic barriers may be inserted into the honeycomb cells and displaced away from the second edge 17, the typical procedure is to place a sound barrier sheet 16 on the second edge 17 of the honeycomb to cover all of the cells. The depth of the cells (acoustic resonators) is equal to the distance between the first edge 15 and the acoustic barrier 16.

Figure 2:
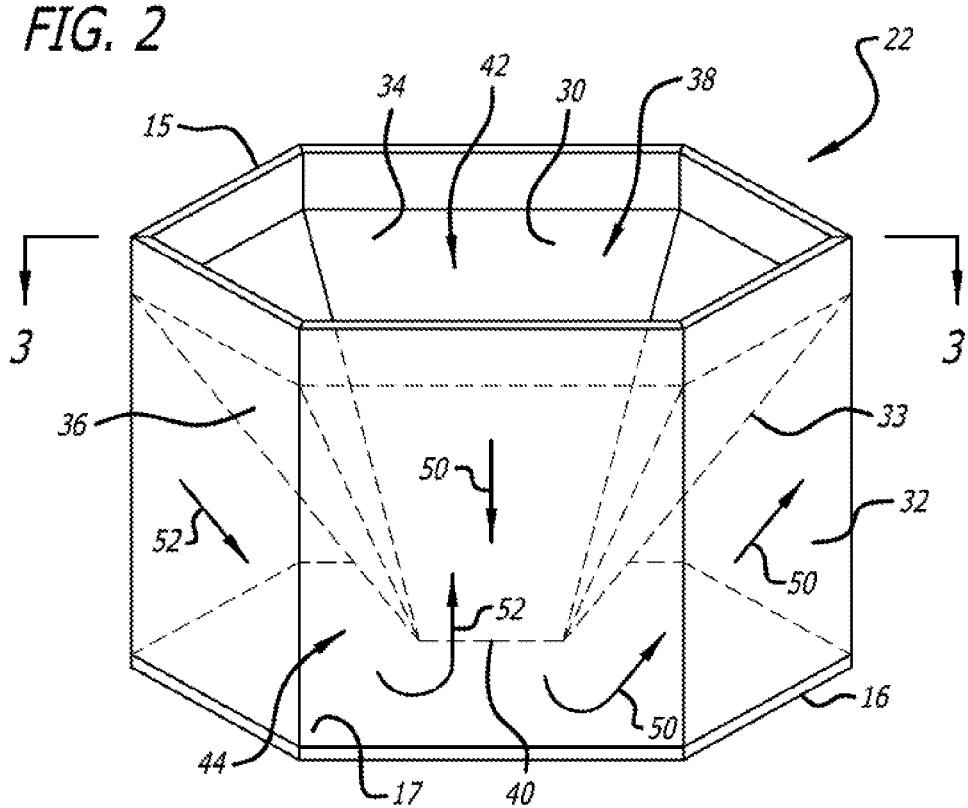
FIG. 2 shows a single exemplary acoustic cell in accordance with the present invention.
Figure 3:
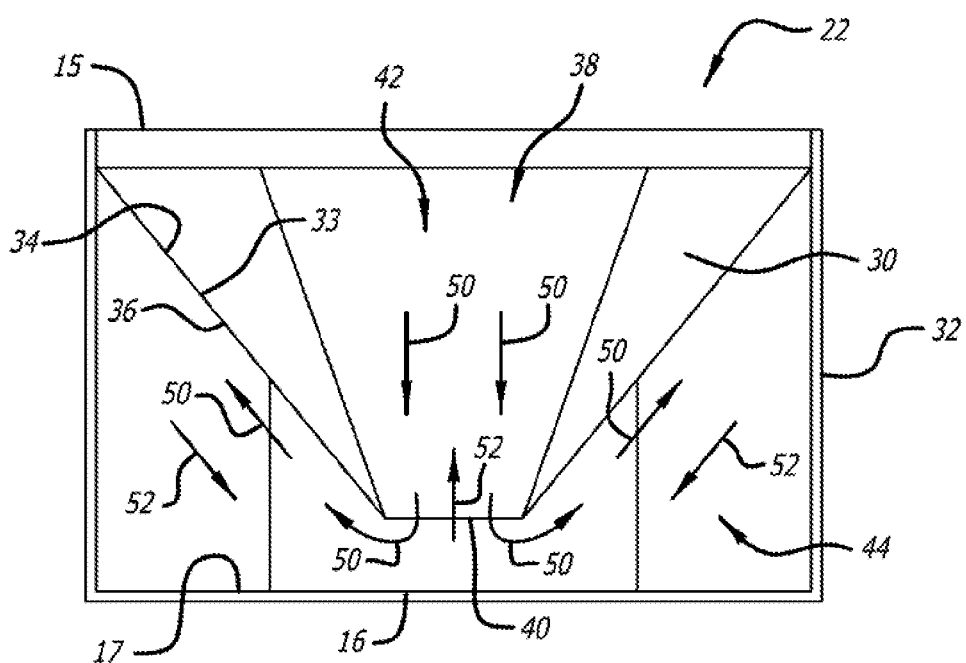
FIG. 3 is a sectional view of FIG. 2, which depicts the inner and outer acoustic chambers.

As shown in FIG. 1, the acoustic honeycomb 12 is made up of many interconnected cells 22. For descriptive purposes, a single cell 22 is shown in FIGS. 2 and 3 without the porous face sheet 14. In accordance with the present invention, a sound wave guide in the form of a frusto-conical duct 30 is located in the acoustic resonator formed by the cell walls 32 and acoustic barrier 16. The duct 30 includes walls 33 that have interior and exterior surfaces 34 and 36, respectively. The duct 30 includes an inlet 38 and an outlet 40.

The frusto-conical duct 30 divides the cell 22 into an inner sound wave channel or chamber 42 and an outer sound wave chamber 44. The inner sound wave chamber 42 is defined by the interior surface 34 of the duct 30, the duct inlet 38, the duct outlet 40 and that portion of the cell wall that extends between the inlet 38 and the first edge 15 of the cell. The outer sound wave chamber 44 is defined by the exterior surface 36 of the duct 30, the cell wall 32, the sound barrier 16 and the duct outlet 40.

As shown in FIGS. 2 and 3, the sound entering the resonator (arrows 50) travels through the inner sound wave chamber 42 and passes through the duct outlet 40 into outer sound wave chamber 44. The sound waves 50 are reflected back by the defining surfaces of the outer sound wave chamber 44 as shown by arrows 52. The reflected sound waves 52 travel back out through the duct outlet 40 into the inner sound wave chamber 42. The use of a sound wave guide, such as frusto-conical duct 30, controls the path of the incoming sound waves so that their effective travel path is greater than the depth of the acoustic resonator. This increase in the effective travel path of the sound waves is controlled and limited by the size and shape of the inner and outer wave chambers. The size and shape of the two wave chambers is in turn determined by the size, shape and location of the wave guide.

Figure 4:
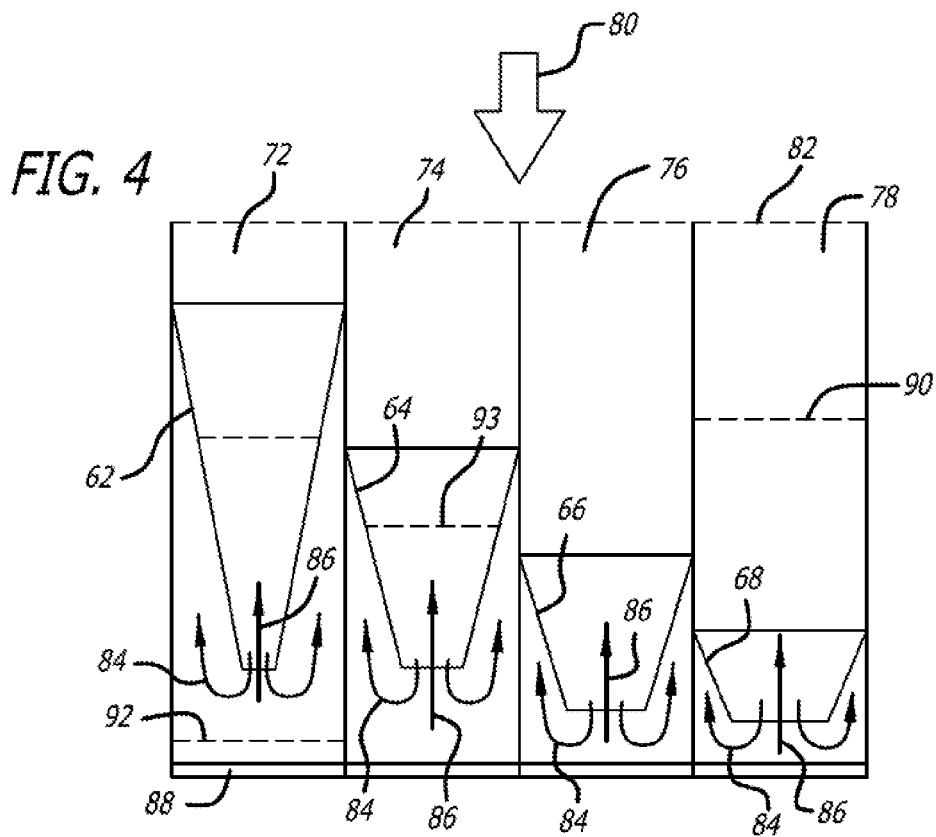
FIG. 4 is a schematic side view showing four different sound wave guides at four different locations within four cells of an acoustic honeycomb.

A wide variety of wave guide sizes and shapes are possible. Four exemplary frusto-conical wave guide sizes and shapes are shown in FIG. 4 at 62, 64, 66 and 68. The wave guides 62, 64, 66 and 68 are shown being located at different points within their respective acoustic cells 72, 74, 76 and 78 in order to demonstrate the versatility of the invention. For example, the size, shape, location and type of material used to make the wave guides can be varied from cell to cell in order to achieve acoustic dampening over a wide range of frequencies. Alternatively, the same wave guide may be placed at the same location within a relatively large group of acoustic cells in order to achieve increased levels of acoustic attenuation for a given frequency range. In practice, one can mix and match the wave guides, and their locations, to produce acoustic structures with a wide variety of acoustic properties.

As shown in FIG. 4, the sound waves 80 pass into the acoustic cells through porous sheet 82. The sound waves, as indicated by arrows 84 pass out through the wave guide outlet into the second acoustic chamber and are reflected back through the wave guide outlet, as indicated by arrows 86. The sound barrier sheet is shown at 88.

Additional acoustic dampening and attenuation can be provided by including one or more acoustic septums within the acoustic cell. For example, an acoustic septum 90 can be included in the acoustic cell 78 above the wave guide 68. An acoustic septum 92 may also be located below the wave guide, as shown in acoustic cell 72. An acoustic septum 93 may be located inside the wave guide 64. An acoustic septum 95 may also be located at the outlet of the wave guide as shown in FIG. 5. It also is possible to include more than one acoustic septum above, in and/or below the wave guide.

The optional acoustic septums can be made from any of the standard acoustic materials used it to provide noise attenuation including woven fibers and perforated sheets. The use of the woven fiber acoustic septums is preferred. These acoustic materials are typically provided as relatively thin sheets of an open mesh fabric that are specifically designed to provide noise attenuation. It is preferred that the acoustic material be an open mesh fabric that is woven from monofilament fibers. The fibers may be composed of glass, carbon, ceramic or polymers. Monofilament polymer fibers made from polyamide, polyester, polyethylene chlorotrifluoroethylene (ECTFE), ethylene tetrafluoroethylene (ETFE), polytetrafluoroethylene (PTFE), polyphenylene sulfide (PPS), polyfluoroethylene propylene (FEP), polyether ether ketone (PEEK), polyamide 6 (Nylon 6, PA6) and polyamide 12 (Nylon 12, PA12) are just a few examples. Open mesh fabric made from PEEK is preferred for high temperature applications, such as nacelles for jet engines. Exemplary septums are described in U.S. Pat. Nos. 7,434,659; 7,510,052 and 7,854,298, the contents of which is hereby incorporated by reference. Septums made by laser drilling plastic sheets or films may also be used.

The wave guides may be made from a wide variety of materials provided that they are compatible with the material(s) used to make the honeycomb. It is preferred that the same types of materials described above for use making acoustic septums are also used to make the wave guides. The wave guide walls are preferably made from a solid material so that there is no sound transfer laterally through the wave guide. The use of solid wave guide walls insures that all of the sound waves entering the acoustic cell must travel completely through the inner sound wave chamber before entering the outer sound wave chamber. If desired, the material used to make the wave guides may be perforated or the material may be a mesh, so that some limited amount of sound wave transfer can occur laterally through the wave guide walls. The use of sound permeable wave guide walls provides another option for varying the sound attenuation properties of the acoustic cell.

The inlet of the frusto-conical wave guide is shaped to match the walls of the acoustic cell. For example, wave guides used in acoustic cells with hexagonal cross-sections will have a hexagonal shape that matches the hexagonal shape of the cell. This allows the wave guide inlet to be securely bonded to the walls of the acoustic cells. The wave guide inlet may be bonded to the acoustic cell walls using known adhesive techniques including thermal bonding. A flange may be included as part of the wave guide to provide increased surface area for bonding to the honeycomb walls. The wave guide may be made in the same manner, inserted into the acoustic cell and bonded in place in the same manner as the acoustic septums described above in U.S. Pat. Nos. 7,434,659; 7,510,052 and 7,854,298, the contents of which is hereby incorporated by reference. The main difference being that a frusto-conical duct is inserted and bonded into the acoustic cell rather than a planar acoustic septum.

The wave guide inlet does not have to match the cross-sectional shape of the acoustic cell. The inlet may have a smaller cross-sectional area and/or a different shape. In these cases, a shoulder or connecting piece is provided between the perimeter of the inlet and the cell walls. The shoulder is preferably made from a sound impervious material so that all of the sound waves are directed through the inlet. If desired, the shoulder or connecting piece can be made from a sound permeable material, such as mesh or perforated septum material.

The wave guide outlet may have a variety of cross-sectional shapes. Circular wave guide outlets are preferred. However, oval outlets and polygonal outlets are possible. The cross-sectional shape of the outlet does not have to match the shape of the wave guide inlet. In a preferred embodiment, the wave guide inlet has a hexagonal cross-section that matches the cell shape and the wave guide outlet has a circular cross-section. The wave guide inlet is preferably larger than the outlet. However, there are situations where the wave guide inlet can be smaller than the outlet.

The materials used to make the honeycomb can be any of those typically used in acoustic structures including metals, ceramics and composite materials. Exemplary metals include aluminum and aluminum alloys. Exemplary composite materials include fiberglass, Nomex and various combinations of graphite or ceramic fibers with suitable matrix resins. Matrix resins that can withstand relatively high temperatures (300° F. to 400° F.) are preferred. The materials used to make the solid face sheet 16 can also be any of the solid face sheet materials commonly used for acoustic structures which typically include the same type of materials used to make the honeycomb structure. The materials used to make the porous face sheet 14 can also be any of the materials commonly used for such porous structures provided that the pores or perforations in the structure are sufficient to allow the sound waves from the jet engine or other source to enter into the acoustic cells or resonators.

For jet engine nacelles, the honeycomb cells will typically have a cross-sectional area of between about 0.1 to 0.5 square inch and a depth of between about 1.0 and 2.0 inches. The use of wave guides in accordance with the present invention allows one to make nacelles having honeycomb cell depths at the lower end of the thickness range (1.0 inch) that provide the same low-frequency noise attenuation or suppression that is provided by nacelles having thicknesses at the upper end of the thickness range (2.0 inch).

The ability to take a nacelle that is a certain thickness and increase the effective resonator length without increasing the thickness of the resonator or decreasing the number of available acoustic cells is a significant advantage, since it allows one to make the nacelle as thin and lightweight as possible, while still being able to dampen the relatively lower frequency noise that is being generated by modern jet engine designs.

As mentioned previously, it is preferred that a solid face sheet 16 be used as the sound barrier to close off the second edge 17 of the honeycomb to form the acoustic resonators. In this situation, the sound barriers are all located along the second edge of the honeycomb. The acoustic depth of the cells can be varied, if desired, by using individual barriers instead of a face sheet. The individual barriers are inserted and bonded in place within the cell to provide the desired acoustic resonator depth.

Having thus described exemplary embodiments of the present invention, it should be noted by those skilled in the art that the within disclosures are exemplary only and that various other alternatives adaptations and modifications may be made within the scope of the present invention. Accordingly, the present invention is not limited by the above-described embodiments, but is only limited by the following claims.

What is claimed is:

1. An acoustic structure for reducing noise generated from a source, said acoustic structure comprising:
   a honeycomb comprising a first edge to be located closest to said source and a second edge, said honeycomb comprising a plurality of walls that extend between said first and second edges, said walls defining a plurality of cells wherein each of said cells has a cross-sectional area measured perpendicular to said walls;
   an acoustic barrier located at the second edge of said honeycomb or within at least one of said cells to form an acoustic resonator wherein the depth of said acoustic resonator is equal to the distance between the first edge of said honeycomb and said acoustic barrier;
   a frusto-conical duct located in said acoustic resonator, said frusto-conical duct comprising a sound permeable wall having interior and exterior surfaces, said sound permeable wall comprising an inlet edge defining a duct inlet and outlet edge defining a duct outlet wherein said duct inlet is closer to said honeycomb first edge than said duct outlet and wherein said sound permeable wall is an open mesh fabric or a perforated plastic film.

2. An acoustic structure according to claim 1 wherein said duct inlet is larger than said duct outlet.

3. An acoustic structure according to claim 2 wherein the size of said duct inlet is substantially equal to the cross-sectional area of said cell.

4. An acoustic structure according to claim 1 wherein said open mesh fabric is woven from monofilament fibers.

5. An acoustic structure according to claim 4 wherein said monofilament fibers are polyether ether ketone.

6. An acoustic structure according to claim 1 wherein said open mesh fabric or said perforated plastic film is bonded to said cell wall at said duct inlet.

7. An acoustic structure according to claim 2 wherein said duct inlet is in the shape of a hexagon and said duct outlet is in the shape of a circle.

8. An acoustic structure according to claim 1 wherein a planar acoustic septum is located between the first edge of said honeycomb and said duct inlet.

9. An acoustic structure according to claim 1 wherein a planar acoustic septum is located inside said frusto-conical duct.

10. An acoustic structure according to claim 1 wherein a planar acoustic septum is located between said duct outlet and said acoustic barrier.

11. An engine nacelle comprising an acoustic structure according to claim 1.

12. An airplane comprising a nacelle according to claim 11.

13. A method for making an acoustic structure for reducing noise generated from a source, said method comprising the steps of:
providing a honeycomb comprising a first edge to be located closest to said source and a second edge, said honeycomb comprising a plurality of walls that extend between said first and second edges, said walls defining a plurality of cells wherein each of said cells has a cross-sectional area measured perpendicular to said walls;
locating an acoustic barrier at the second edge of said honeycomb or within at least one of said cells to from an acoustic resonator wherein the depth of said acoustic resonator is equal to the distance between the first edge of said honeycomb and said acoustic barrier;
locating a frusto-conical duct in said acoustic resonator, said frusto-conical duct comprising a sound permeable wall having interior and exterior surfaces, said sound permeable wall comprising an inlet edge defining a duct inlet and outlet edge defining a duct outlet wherein said duct inlet is closer to said honeycomb first edge than said duct outlet and wherein said sound permeable wall is an open mesh fabric or a perforated plastic film.

14. A method for making an acoustic structure according to claim 13 wherein said duct inlet is larger than said duct outlet.

15. A method for making an acoustic structure according to claim 14 wherein the size of said duct inlet is substantially equal to the cross-sectional area of said cell.

16. A method for making an acoustic structure according to claim 15 wherein the step of locating said frusto-conical duct in said acoustic resonator comprises bonding said open mesh fabric or said perforated plastic film to said cell wall at said duct inlet.

17. A method for making an acoustic structure according to claim 13 wherein said duct inlet is in the shape of a hexagon and said duct outlet is in the shape of a circle.

18. A method for making an acoustic structure according to claim 13 wherein said acoustic structure is a nacelle for a jet engine.

19. A method for reducing the noise generated from a source of noise, said method comprising the step of at least partially surrounding said source of noise with an acoustic structure according to claim 1.

20. A method for reducing the noise generated from a source of noise according, to claim 19 wherein said source of noise is a jet engine and said acoustic structure is a nacelle.

* * * * *